United States Patent [19]

Moon

[11] 4,244,897
[45] Jan. 13, 1981

[54] METHOD AND APPARATUS TO CONTROL THE DENSITY OF PRODUCTS PRODUCED FROM AN EXTRUSION PROCESS

[75] Inventor: William S. Moon, San Jose, Calif.

[73] Assignee: Measurex Corporation, Cupertino, Calif.

[21] Appl. No.: 23,009

[22] Filed: Mar. 22, 1979

[51] Int. Cl.³ .................... B29D 27/00; G01G 11/00
[52] U.S. Cl. ................... 264/40.2; 264/40.4; 264/40.6; 264/53; 425/140; 425/141; 425/144
[58] Field of Search .............. 264/40.2, 40.4, 40.7, 264/40.6, 53; 425/140, 141, 144

[56] References Cited

U.S. PATENT DOCUMENTS

| | | | |
|---|---|---|---|
| 1,984,166 | 12/1934 | Walter | 264/40.2 |
| 3,185,924 | 5/1965 | Locher | 264/40.2 X |
| 3,474,160 | 10/1969 | Doering | 264/40.4 X |
| 3,890,078 | 6/1975 | Straumanis | 264/40.7 X |
| 3,914,537 | 10/1975 | Cereijo et al. | 264/40.2 |
| 4,087,499 | 5/1978 | Bayonnet | 264/40.4 X |
| 4,088,721 | 5/1978 | Apicella | 264/40.4 |
| 4,156,913 | 5/1979 | Apicella | 264/40.4 X |

*Primary Examiner*—Philip Anderson
*Attorney, Agent, or Firm*—Ronald L. Yin

[57] ABSTRACT

Density of products produced from a foam extrusion process is controlled by measuring the thickness and the basis weight. The density is calculated and is compared to a target, or desired value, to produce an error signal. The error signal is used to control the density.

10 Claims, 2 Drawing Figures

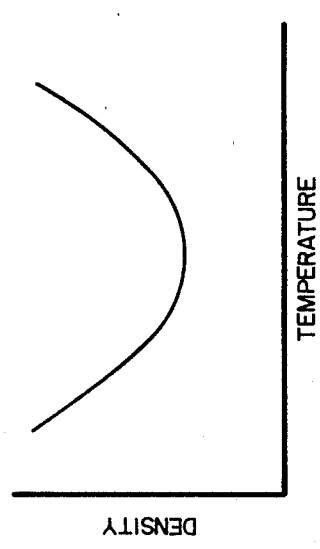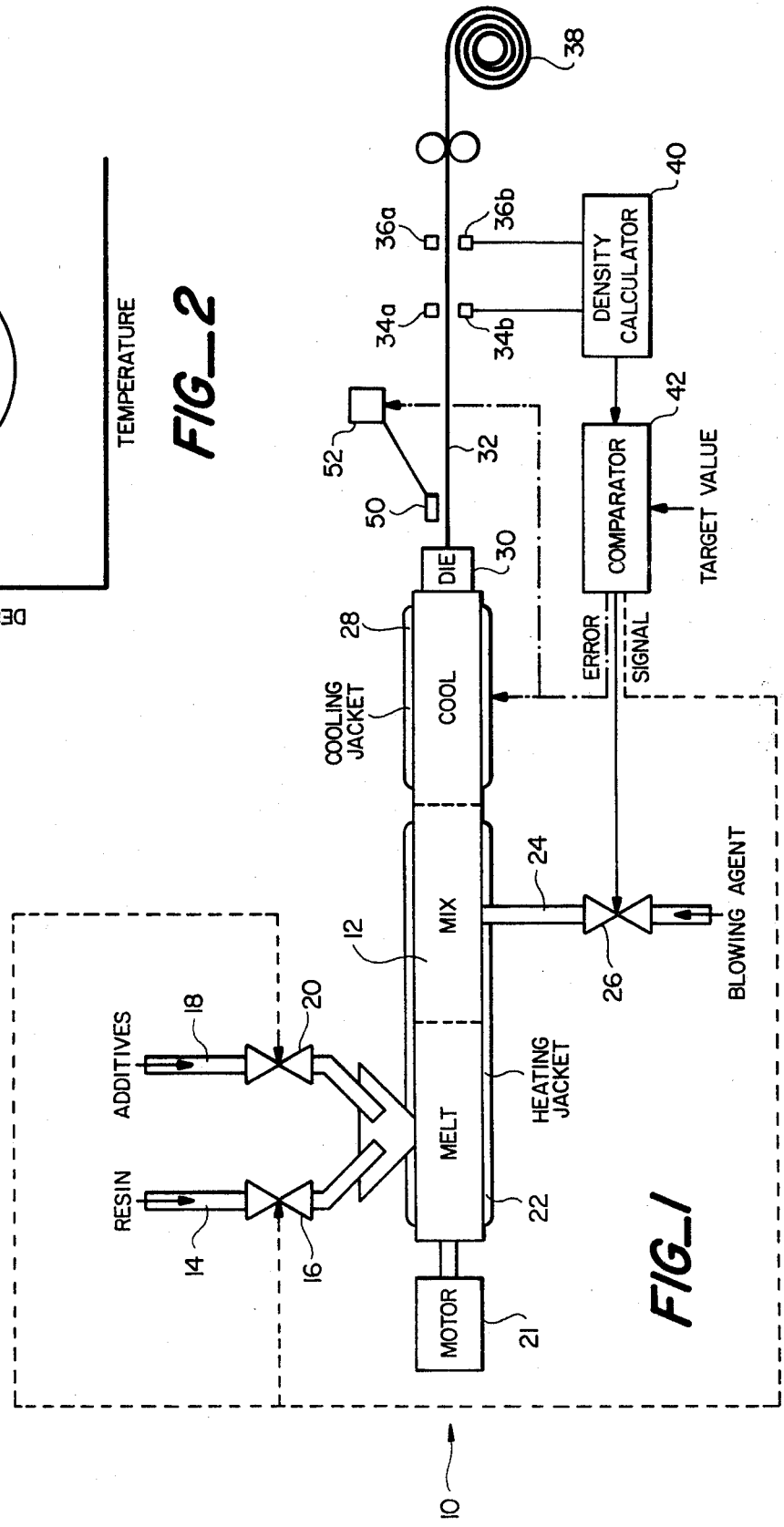

METHOD AND APPARATUS TO CONTROL THE DENSITY OF PRODUCTS PRODUCED FROM AN EXTRUSION PROCESS

BACKGROUND OF THE INVENTION

1. Field of Invention

The present invention relates to a method and an apparatus for controlling the density of products and, more particularly, to products produced from a foam extrusion process.

2. Prior Art

In a foam extrusion system, materials such as resin, additives, and blowing agent are all introduced into an extruder. The resin and additives are heated (e.g., 450° F. or 230° C.) and are mixed with the blowing agent to form a mixture. The mixture is then cooled and is extruded through a die. Products produced from such a foam extrusion system include disposable cups and dishes, egg cartons, and meat trays.

In certain applications, it is highly desirable to control the density of the products produced by such a foam extrusion system. Heretofore, however, such control has been formed manually, and has been lacking in accuracy and speed of response.

SUMMARY OF THE INVENTION

The present invention is an apparatus for automatically and continuously controlling the density of products produced from a foam extrusion process to maintain the density of each of the products at a predetermined value. The extrusion process has an extruder wherein a substance is introduced and is heated; the substance is then mixed with a blowing agent to form a mixture; the mixture is cooled and is extruded to produce the product. The apparatus comprises means for measuring the weight per unit area of the product; means for detecting the thickness of the product, means for calculating the value of density based upon the weight per unit area and the thickness; and means for comparing the calculated value of density to the predetermined value to produce an error signal. Control of the density of the product is based upon the error signal.

The present invention is also a method for continuously and automatically controlling the density of products produced from a foam extrusion process to maintain the density of each of the products at a predetermined value. The method comprises continuously measuring the weight per unit area of the product; continuously detecting the thickness of the product; calculating the value of the density of the product based upon the weight per unit area and the thickness; comparing the calculated value to the predetermined value to produce an error signal; and controlling the density based upon the error signal.

BRIEF DESCRIPTION OF THE DRAWING

FIG. 1 is a block diagram illustrating the apparatus and method of the present invention.

FIG. 2. is a plot of the density of the foam product as a function of the temperature of the mixture, immediately after extrusion from the extruder.

DETAILED DESCRIPTION OF THE INVENTION

Referring to FIG. 1, a system for extruding foam products is generally indicated by reference numeral 10. The system 10 comprises an extruder 12. The extruder 12 has three sections: a melt section, a mix section, and a cool section. Resin enters into the melt section of extruder 12 through the first inlet 14. Typically, the resin is in a solid form, such as pellets, beads or powder. The amount of resin entering into the extruder 12 is regulated by first metering device 16. Additives enter into the melt section of extruder 12 through the second inlet 18. Typically, the additives are also in a solid form. The amount of additives entering into the extruder 12 is regulated by second metering device 20. For convenience, the additives and resin may be premixed in a batch and enter together into the melt section of the extruder 12 through the same inlet (e.g., first inlet 14) and regulated by a single metering device (e.g., first metering device 16). The metering device 16 and 20 may be conventional weight feeders. In the melt section of extruder 12, the resin and additives are heated to an elevated temperature (e.g., 450° Fahrenheit or 230° Centrigrade), sufficient to melt the resin and the additives. Typically, a heating jacket 22 surrounds the melt section and the mixing section of extruder 12 and provides the requisite heat. A motor 12 is used to move the resin and additives and to assist in melting the resin and additives.

A blowing agent enters into the mix section of extruder 12 through third inlet 24 at a high pressure Typically, this is at about 5000 p.s.i. or 350 Kgm/cm². The amount of blowing agent which enters into the extruder 12 through third inlet 24 is controlled by a valve 26. Resin and additives which have been melted in the melt section of extruder 12 are mixed with the blowing agent in the mix section of extruder 12 to form a mixture. The mixture is then cooled in the cooling section of extruder 12. Typically, this is accomplished by cooling jacket 28 surrounding the cooling section of extruder 12. Finally, the mixture is extruded from the extruder 12 through a die 30 to form products 32. The die 30 is typically a circular die. Foam products 32 which are produced from the foam extrusion system 10 may be used to fabricate products such as egg cartons and meat trays.

Once the foam product 32 is extruded from the die 30, the product 32 may be subject to further cooling by for example, an air blower 50. The amount of air blowing from the air blower 50 is controlled by an air pump 52. The weight per unit area of the foam product 32 is measured by a basis weight sensor 34. The basis weight sensor 34 comprises a radiation source 34a to one side of the product 32 and a detector 34b to the other side of the product 32. The detector 34b measures the amount of radiation received after the radiation has passed through the product 32 from the source 34a. Such basis weight sensor 34 is well known in the art, see e.g., U.S. Pat. No. 3,681,595 and U.S. Pat. No. 3,697,755. The thickness of the product 32 is detected by a thickness sensor 36. The thickness sensor 36 can comprise a first section 36a to one side of the product 32 and a second section 36b to the other side of the product 32. The thickness sensor 36 can be of a non-contacting type, such as that disclosed in U.S. Pat. No. 4,107,606 or the thickness sensor 36 can be of a contacting type, such as that disclosed in U.S. Pat. No. 4,107,847. The product 32 is eventually wound up at a roll 38.

In the apparatus of the present invention, the product 32 is continuously measured by the basis weight sensor 34, and continuously measured by the thickness sensor 36. The measurements from the basis weight sensor 34 and the thickness sensor 36 are entered into a density calculator 40. The density calculator 40 calculates the value of the density of the product 32 based upon the basis weight sensor 34 and the thickness sensor 36, in accordance with the formula of $$\text{Density} = \frac{\text{Weight}}{\text{Volume}} = \frac{\text{Weight}}{\text{Unit Area}} \times \frac{1}{\text{Thickness}}$$

The calculated value of density based upon the density calculator 40 is entered into a comparator 42. A target value, or a predetermined value, the value at which it is desired to have the product 32, is also entered into the comparator 42. The comparator 42 compares the target value to the calculated value and produces an error signal. The error signal is used to adjust the system 10 in order to product the product 32 having a density value at the target value. In one embodiment shown in the drawing, the error signal is used to control the valve 26, regulating the amount of blowing agent entering into the extruder 12. The error signal may also be used to control the amount of resin and additives that enter into the extruder 12 through the first metering device 16 and second metering device 20, as shown by the dotted line. Finally, the error signal may also be used to control the temperature of the mixture immediately prior to or immediately after being extruded through the die 30. This can be accomplished by controlling the amount of cooling provided by the cooling jacket 28 or the amount of air provided by air pump 52 to be blown through air blower 50. This is shown as a dash-dot-dash line. Clearly, the error signal can be used to control the density in any combination of the foregoing described ways.

It should be appreciated that the apparatus and method of the present invention is the rapid, continuous, and automatic control of a foam extrusion system to maintain the density of the product produced from such a system at a predetermined value. The present inventions offer the advantages of automatic control, improved in quality of the extruded product, and an increase in throughput (production rate), thereby reducing the production cost.

The theory of operation of the present invention is as follows. In general, the blowing agent is a compressible fluid, such as Freon. Typically, the freon is injected into the extruder 12 as a liquid under high pressure, such as 5000 p.s.i. or 350 Kgm/cm$^2$ and although the Freon has a relatively low melting point, the Freon remains in a liquid state under high pressure when mixed with resin and additives in the mix section of the extruder 12. As the mixture of resin, additives and Freon is cooled and is then extruded from the die 30, the pressure of the atmosphere outside of the extruder 12 is less than the pressure inside the extruder 12. The decrease in pressure causes the evaporation of the Freon, creating pockets of gas (foam cells). The formation of the foam cells occur immediate after extrusion from the die 30.

The size and number of foam cells depend on the amount of Freon in the mixture. As the amount of freon in the mixture increases, the size and the number of foam cells increases. As a result, the foam product 32 becomes more porous or less dense.

The density of the foam product 32 is also dependent upon the amount of resin and additives introduced into the extruder 12, and extruder therefrom. As the amount of resin is decreased with the same amount of Freon, the product 32 is extruded would have more foam cells per unit volume. Thus, the density would decrease.

Finally, the density of the product 32 is affected by the temperature of the mixture when the mixture exits the extruder 12 during the formation of the foam cell. As the temperature of the mixture increases, the viscosity of the mixture decreases and the surface tension of the foam cells decreases, which results in larger foam cells. This would decrease the density of the foam product 32. However, as the temperature of the mixture increases further, the viscosity of the mixture becomes so low that the mixture can no longer form foam cells. In effect, the foam cells would burst and collapse with the result that the number of foam cells would decrease. This would increase the density. The effect of temperature of the mixture on the density of the foam product 32 is shown in FIG. 2. As can be seen from FIG. 2, increasing the temperature would initially cause a decrease in density, up to a point, followed by an increase in density.

Although the invention has been described with respect to a foam extrusion system 10 comprising a single extruder 12, the method and apparatus of the present invention may also be used to control the density of foam products produced from a foam extrusion system having a plurality of extruders, such as that for a tandem extruder system.

What is claimed is:

1. A method for continuously and automatically controlling the product from a foam extrusion process to maintain the density of said products at a pre-determined value, said process has an extruder wherein resin and additives are introduced and are heated, a blowing agent is then introduced, and is mixed with the resin and additives to form a mixture, said mixture is cooled and is extruded to produce said product; said method comprising:

continuously measuring the weight per unit area of said product by a basis weight sensor and generating an electrical signal related thereto;

continuously detecting the thickness of said product by a thickness sensor and generating an electrical signal related thereto;

generating an electrical signal related to the calculated value of density of said product based upon the electrical signal related to said basis weight measured and the electrical signal related to said thickness detected;

comparing the electrical signal related to said calculated density value to an electrical signal related to said predetermined density value to produce an error signal; and controlling the density of the product produced by said process based upon the error signal.

2. The method of claim 1 wherein said controlling step comprises:

adjusting the amount of blowing agent introduced into the extruder.

3. The method of claim 2 wherein the electrical signal related to the calculated value of density is based upon an operation of:

dividing the weight per unit area that is measured by the thickness that is detected.

4. An apparatus for continuously and automatically controlling products produced from a foam extrusion process to maintain the density and thickness of each of said products at a predetermined value, said process has an extruder wherein resin and additives are introduced and are heated, a blowing agent is then introduced into the extruder and is mixed with the resin and additives to form a mixture, said mixture is cooled and is extruded to produce said product; said apparatus comprising:

- basis weight sensor capable of measuring the weight per unit area of said product and generating an electrical signal related thereto;
- thickness sensor capable of detecting the thickness of said product and generating an electrical signal related thereto;
- a density calculator capable of calculating the value of density of said product from said above electrical signal and generating a signal corresponding to the calculated density value;
- means for comparing said calculated density value to an electrical signal related to said predetermined density value to produce an error signal; and
- means for controlling the density of the product produced by said process based upon said error signal.

5. The apparatus of claim 1 wherein said controlling means comprises means for adjusting the amount of resin and additives introduced into said extruder.

6. The apparatus of claim 1 wherein said controlling means comprises means for adjusting the temperature of said mixture.

7. The apparatus of claim 1 wherein said controlling means comprises means for adjusting the amount of blowing agent introduced into said extruder.

8. The apparatus of claim 7 wherein said basis weight sensor comprises a radiation source to one side of said product, capable of emitting a beam of radiation through said product; and a radiation detector to the other side of said product capable of detecting the amount of radiation transmitted through said product.

9. The apparatus of claim 8 wherein said thickmess sensor comprises a non-contacting caliper gauge.

10. The apparatus of claim 8 wherein said thickness sensor comprises a contacting caliper gauge.

* * * * *

UNITED STATES PATENT AND TRADEMARK OFFICE
CERTIFICATE OF CORRECTION

PATENT NO. : 4,244,897
DATED : January 13, 1981
INVENTOR(S) : William S. Moon

It is certified that error appears in the above—identified patent and that said Letters Patent is hereby corrected as shown below:

Column 6, line 1, claim 5 should be changed as follows:
        claim "1" should read claim --4--

Column 6, line 4, claim 6 should be changed as follows:
        claim "1" should read claim --4--

Column 6, line 7, claim 7 should be changed as follows:
        claim "1" should read claim --4--

Signed and Sealed this

Eleventh Day of August 1981

[SEAL]

Attest:

Attesting Officer

GERALD J. MOSSINGHOFF
*Commissioner of Patents and Trademarks*